United States Patent
Qi et al.

(10) Patent No.: US 11,811,693 B2
(45) Date of Patent: Nov. 7, 2023

(54) METHOD AND APPARATUS FOR CONFIGURING AND SIGNALLING PTRS IN A TELECOMMUNICATION SYSTEM

(71) Applicant: Samsung Electronics Co., Ltd., Suwon-si (KR)

(72) Inventors: Yinan Qi, Middlesex (GB); Mythri Hunukumbure, Middlesex (GB); Hyun Il Yoo, Suwon-si (KR); Hyung Ju Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 18/058,607

(22) Filed: Nov. 23, 2022

(65) Prior Publication Data

US 2023/0078795 A1 Mar. 16, 2023

Related U.S. Application Data

(63) Continuation of application No. 16/764,375, filed as application No. PCT/KR2018/012645 on Oct. 24, 2018, now Pat. No. 11,515,976.

(30) Foreign Application Priority Data

Nov. 17, 2017 (GB) .................................. 1719102.4

(51) Int. Cl.
*H04L 5/00* (2006.01)
*H04W 72/0453* (2023.01)
*H04W 72/21* (2023.01)

(52) U.S. Cl.
CPC ....... *H04L 5/0048* (2013.01); *H04W 72/0453* (2013.01); *H04W 72/21* (2023.01)

(58) Field of Classification Search
CPC ......................... H04L 5/0048; H04W 72/0453; H04W 72/21; H04W 72/50
See application file for complete search history.

(56) References Cited

U.S. PATENT DOCUMENTS

| 10,554,359 | B2  | 2/2020  | Lee et al.                    |
| 10,701,724 | B2  | 6/2020  | Nimbalker et al.              |
| 10,873,432 | B2* | 12/2020 | Hunukumbure ...... H04L 5/0094 |

(Continued)

FOREIGN PATENT DOCUMENTS

| CN | 104704755 A | 6/2015 |
| CN | 104767592 A | 7/2015 |

(Continued)

OTHER PUBLICATIONS

Combined Search and Examination Report under Sections 17 & 18(3) dated May 18, 2018 in connection with United Kingdom Patent Application No. GB1719102.4, 5 pages.

(Continued)

*Primary Examiner* — Brian T O Connor

(57) ABSTRACT

The present disclosure relates to a pre-5th-Generation (5G) or 5G communication system to be provided for supporting higher data rates Beyond 4th-Generation (4G) communication system such as Long Term Evolution (LTE). Disclosed is a method of defining a resource block or resource element offset for mapping PTRS to a symbol, wherein the offset is determined based on an identifier of a particular user equipment, UE.

20 Claims, 3 Drawing Sheets

(56) References Cited

U.S. PATENT DOCUMENTS

| | | | |
|---|---|---|---|
| 10,924,235 B2* | 2/2021 | Lee | H04L 5/0094 |
| 11,108,605 B2* | 8/2021 | Zhang | H04L 5/0048 |
| 11,147,091 B2 | 10/2021 | Yokomakura et al. | |
| 2015/0282150 A1 | 10/2015 | Nigam et al. | |
| 2019/0165910 A1 | 5/2019 | Lee et al. | |
| 2019/0166615 A1 | 5/2019 | Nimbalker et al. | |
| 2019/0238247 A1 | 8/2019 | Lee et al. | |
| 2020/0077419 A1 | 3/2020 | Lee et al. | |
| 2020/0186311 A1 | 6/2020 | Xu et al. | |
| 2020/0252181 A1 | 8/2020 | Gao et al. | |
| 2020/0403748 A1 | 12/2020 | Yokomakura | |

FOREIGN PATENT DOCUMENTS

| | | |
|---|---|---|
| CN | 108135731 A | 6/2018 |
| WO | 2012023819 A2 | 2/2012 |
| WO | 2017060299 A1 | 4/2017 |
| WO | 2017116141 A1 | 7/2017 |
| WO | 2017118687 A1 | 7/2017 |
| WO | 2019099535 A1 | 5/2019 |

OTHER PUBLICATIONS

Examination Report under Sections 18(3) dated Apr. 17, 2020 in connection with United Kingdom Patent Application No. GB1719102. 4, 3 pages.

Intel et al., "Joint WF on PTRS", 3GPP TSG RAN WG1 Meeting 90bis, Oct. 12, 2017, R1-1718998, 7 pages.

NEC, "Remaining issues on PTRS configurations", 3GPP TSG RAN WG1 Meeting 90bis, Oct. 9-13, 2017, R1-1718012, 3 pages.

Samsung, "Discussion on PT-RS", 3GPP TSG RAN WG1 Meeting 91, Nov. 27-Dec. 1, 2017, R1-1720312, 7 pages.

"3rd Generation Partnership Project; Technical Specification Group Radio Access Network; NR Physical channels and modulation (Release 15)", 3GPP TS 38.211 V15.3.0 (Sep. 2018), 96 pages.

3rd Generation Partnership Project; Technical Specification Group Radio Access Network; NR; Physical layer procedures for data (Release 15), 3GPP TS 38.214 V15.3.0 (Sep. 2018), 96 pages.

RAN WG1, "LS on NR UE feature list", 3GPP TSG RAN WG1 Meeting #92, Feb. 26-Mar. 2, 2018, R1-1803480, 1 page.

"Rel-15 NR UE feature list", R1-1803513, 25 pages.

"3rd Generation Partnership Project; Technical Specification Group Radio Access Network; Study on New Radio (NR) access technology (Release 14)", 3GPP TR 38.912 V14.0.0 (Mar. 2017), 74 pages.

NTT Docomo, Inc., "New WID on New Radio Access Technology", 3GPP TSG RAN Meeting #75, Mar. 6-9, 2017, RP-170847, 8 pages.

NTT Docomo, Inc., "[Draft]LS on NR UE feature list", 3GPP TSG RAN WG1 Meeting #92, Feb. 26-Mar. 2, 2018, R1-1803479, 1 page.

"Rel-15 NR UE feature list", R1-1803478, 25 pages.

"3rd Generation Partnership Project; Technical Specification Group Radio Access Network; NR; Radio Resource Control (RRC) protocol specification (Release 15)", 3GPP TS 38.331 V15.3.0 (Sep. 2018), 445 pages.

Ericsson, "RRC parameters for PTRS", 3GPP TSG RAN WG1 Meeting 90bis, Oct. 9-13, 2017, R1-1719071, 2 pages.

Ericsson, "Summary of PTRS open issues", 3GPP TSG-RAN WG1 #90bis, Oct. 9-13, 2017, R1-1718845, 9 pages.

CATT, "Remaining issues on PT-RS", 3GPP TSG RAN WG1 Meeting 90bis, Oct. 9-13, 2017, R1-1717819, 4 pages.

International Search Report dated Jan. 24, 2019 in connection with International Patent Application No. PCT/KR2018/012645, 2 pages.

Examination report dated Mar. 28, 2022, in connection with Indian Application No. 202047021212, 7 pages.

Communication pursuant to Article 94(3) EPC dated Apr. 25, 2022, in connection with European Application No. 18877789.0, 7 pages.

Supplementary European Search Report in connection with European Application No. 18877789.0 dated Oct. 30, 2020, 12 pages.

Huawei, et al., "Further details of PTRS," R1-1717306, 3GPP TSG RAN WG1 Meeting #90bis, Prague, Czech Republic, Oct. 9-13, 2017, 13 pages.

Spreadtrum Communications, "Remaining issues on PT-RS for CP-OFDM," R1-1717746, 3GPP TSG RAN NG1 Meeting 90bis, Prague, Czech Republic, Oct. 9-13, 2017, 4 pages.

China National Intellectual Property Administration, "Notification of the Decision to Grant" dated Apr. 27, 2023, in connection with Chinese Patent Application No. CN201880074205.0, 9 pages.

Huawei et al., "WF on Remaining Issues on PTRS for CP-OFDM—Part II," R1-1711895, 3GPP TSG RAN WG1 Ad Hoc Meeting, Qingdao, China Jun. 27-30, 2017, 5 pages.

Korean Intellectual Property Office, "Notice of Preliminary Rejection," dated Aug. 7, 2023, in connection with Korean Patent Application No. 10-2020-7017557, 8 pages.

* cited by examiner

[Fig. 1]
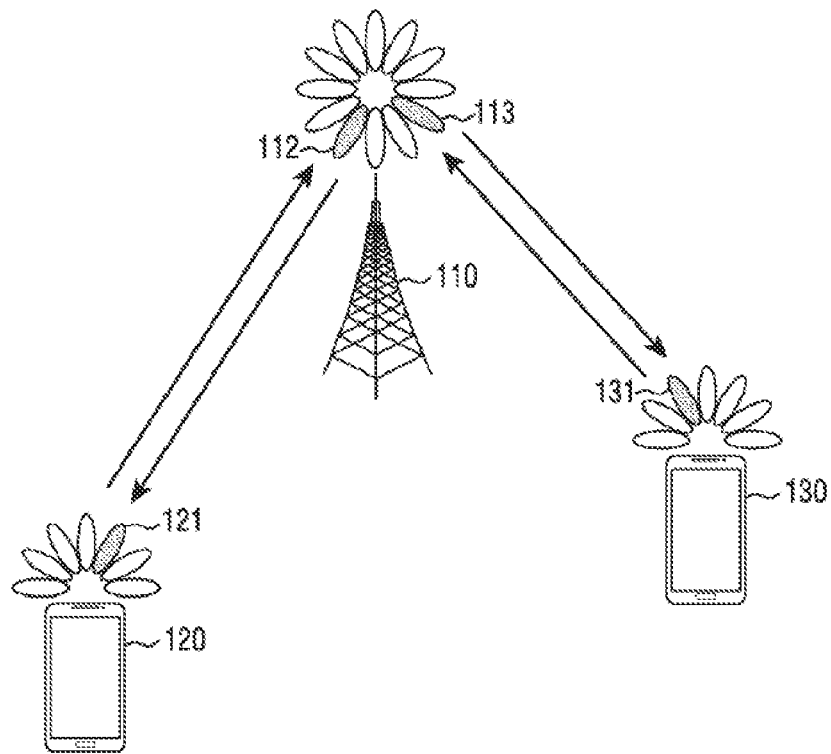
[Fig. 2]
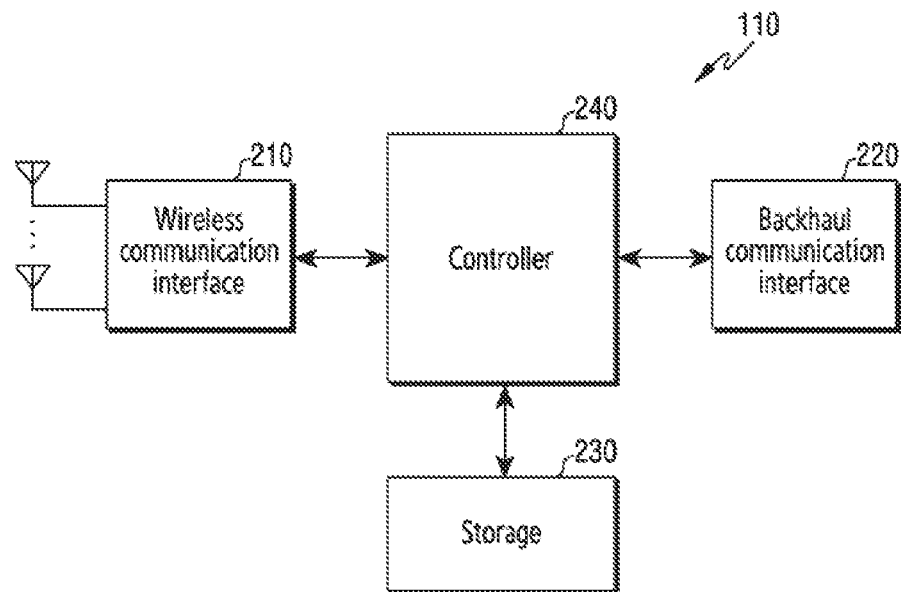

[Fig. 3]
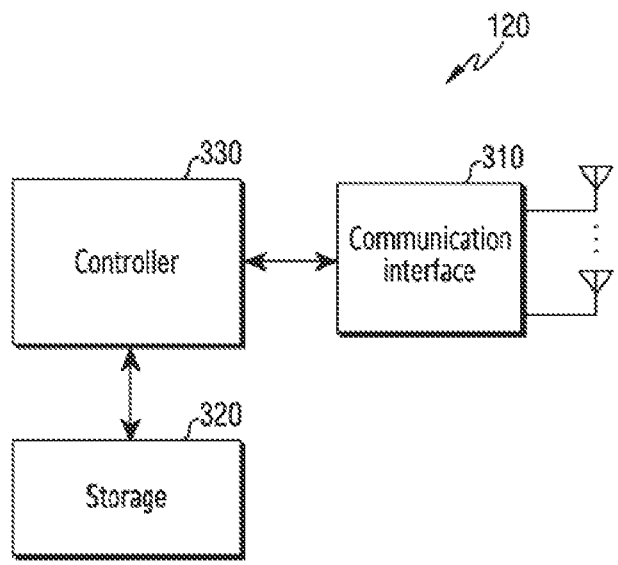
[Fig. 4]
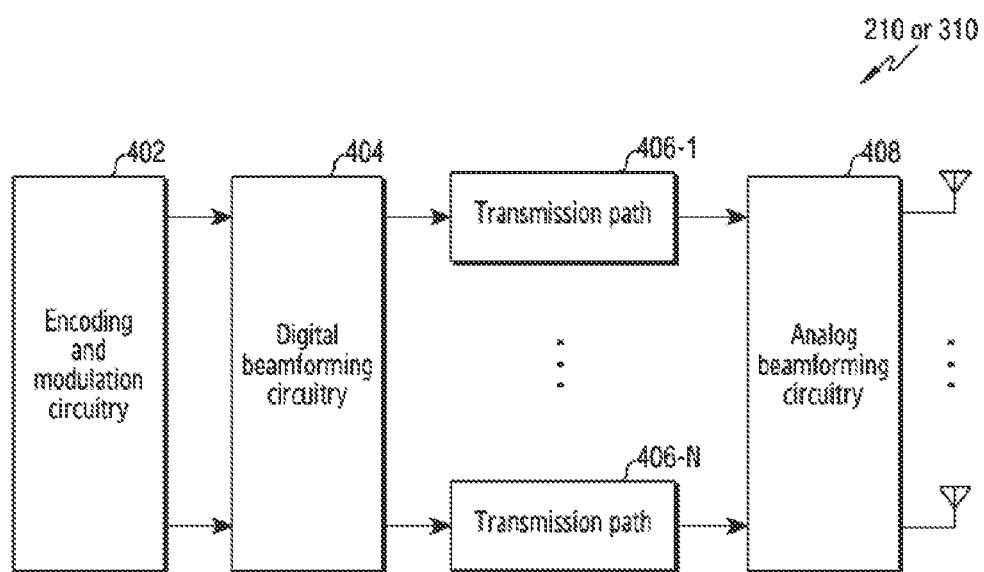

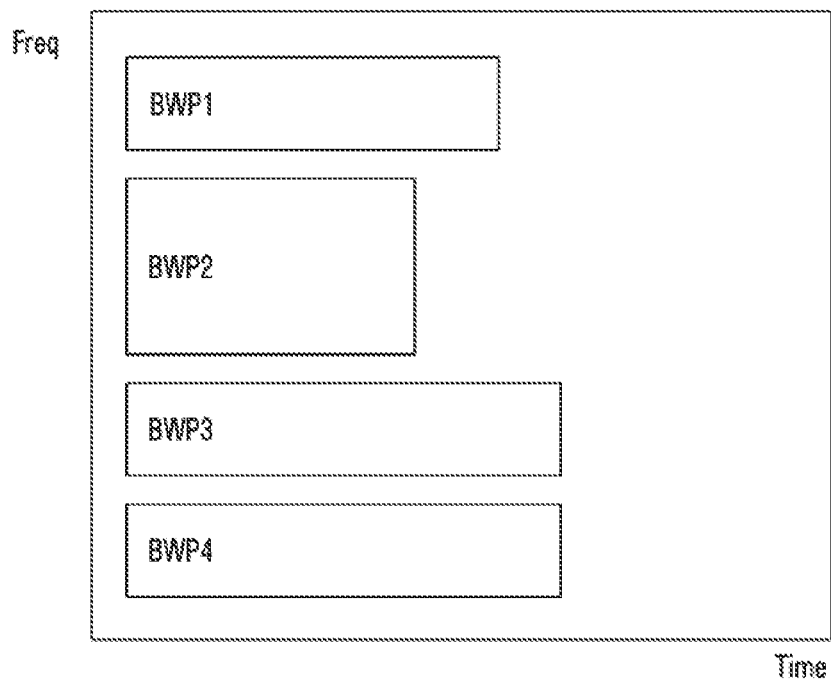
[Fig. 5]

METHOD AND APPARATUS FOR CONFIGURING AND SIGNALLING PTRS IN A TELECOMMUNICATION SYSTEM

CROSS-REFERENCE TO RELATED APPLICATIONS

This application is a continuation of application Ser. No. 16/764,375, now U.S. Pat. No. 11,515,976 issued Nov. 29, 2022, which is a 371 of International Application No. PCT/KR2018/012645 filed on Oct. 24, 2018, which claims priority to United Kingdom Patent Application No. 1719102.4 filed on Nov. 17, 2017, the disclosures of which are herein incorporated by reference in their entirety.

BACKGROUND

1. Field

The present disclosure relates to a telecommunication system. It particularly relates to a so-called New Radio (NR) or Fifth Generation (5G) telecommunication system making use of the Bandwidth Parts (BWP) functionality.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The BWP functionality allows available radio spectrum to be subdivided in a manner whereby each part of the BWP assignment can operate according to different parameters. For instance, a User Equipment (UE) can be allocated up to 4 BWPs with one being assigned to a particular service or class of data with specific numerology, for instance.

One particular parameter which can vary across different BWPs is the phase tracking reference signal (PTRS). This is provided to allow the UE to compensate for phase variations in a received resource element (RE). The density/pattern of PTRS may vary due to many factors, for instance 15 KHz to 60 KHz sub-carrier spacings in different BWPs.

One problem may be inter-UE interference on PTRS symbols. In order to address this problem, RB level PTRS offset is introduced. This RB level PTRS offsets may also depend on the configurations of BWPs in neighbouring UEs. Considering the fact that other PTRS configuration parameters also depend on the BWP configuration, with multiple BWPs configured to a specific UE, the signalling overhead could be significant and the embodiments of the present disclosure aim to address such problems.

SUMMARY

An objective of embodiments of this invention is to address possible issues with RRC configuration and UE reporting for PTRS per bandwidth part (BWP). In other words, there may be excessive signalling required and embodiments of the present disclosure seek to reduce such signalling overhead.

According to the present disclosure there is provided an apparatus and method as set forth in the appended claims. Other features of the invention will be apparent from the dependent claims, and the description which follows.

According to a first aspect of the invention, there is provided a method of defining a Resource Block or Resource Element offset for mapping PTRS to a symbol, wherein the offset is determined based on an identifier of a particular User Equipment, UE.

According to a second aspect of the invention, there is provided a method for operating of a base station (BS) in a wireless communication system, the method comprising determining at least one PTRS configuration by determining resource block (RB) and/or resource element (RE) offset for mapping phase tracking reference signal (PTRS) to a scheduled RBs, wherein the scheduled RBs are allocated to a particular user equipment (UE) for data transmission, transmitting the at least one PTRS configuration and mapping PTRS to symbols designated by the offset in the scheduled RBs, wherein the offset is determined based on an identifier of a particular User Equipment, UE.

In an embodiment, the identifier for the UE is configured by the network and the offset is determined by the UE. The network comprises one or more network entities, such as controllers and base stations.

In an embodiment, the offset is determined according to one of:

$$RB_{offset} = \left\lfloor \frac{C\text{-}RNTI}{1/FD} \right\rfloor, \quad (1a)$$

$$RB_{offset} = 1/FD - \left\lfloor \frac{C\text{-}RNTI}{1/FD} \right\rfloor, \quad (1b)$$

$$RB_{offset} = \left\lfloor \frac{\text{partial } C\text{-}RNTI}{1/FD} \right\rfloor, \quad (2)$$

or (3) the last $\log_2(1/FD)$ bits of C-RNTI.

In an embodiment, the offset is configured on a per-BWP basis.

In an embodiment, a PTRS configuration may be determined on a per-BWP basis and is transmitted to the UE using an offset configuration where only a difference between a default configuration and the determined configuration is transmitted to the UE.

In an embodiment, a PTRS configuration may be determined on a per-BWP basis and is transmitted to the UE using an additional bit, whereby the additional bit is used to indicate the use of a default configuration.

In an embodiment, a PTRS configuration may be determined on a per-BWP basis and is transmitted to the UE using a codeword, whereby an agreed scheme is used to transmit the PTRS configuration.

In an embodiment, more common configurations have shorter codewords.

In an embodiment, the configuration is transmitted either by RRC or DCI signalling.

In an embodiment, the PTRS configuration comprises one or more of RB offset, frequency density table thresholds and time density table thresholds.

In an embodiment, the default configuration is a configuration for default BWP.

In an embodiment, the PTRS configuration is recommended by and reported by the UE.

In an embodiment, the UE reporting is performed by one of UCI or UE Capability Signalling.

According to a second aspect, apparatus is arranged to perform the method of the first aspect.

In an embodiment, the apparatus comprises a network entity and a User Equipment.

Although a few preferred embodiments of the present disclosure have been shown and described, it will be appreciated by those skilled in the art that various changes and modifications might be made without departing from the scope of the invention, as defined in the appended claims.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure; and FIG. 5 illustrates a representation of BWP configuration.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for identifying symbols for PTRS in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may include PTRS mapping function. Here, the PTRS mapping function may be a command/code temporarily resided in the controller 240, a storage space that stores the command/code, or a part of circuitry of the controller 240.

According to exemplary embodiments of the present disclosure, the controller 240 may determine offset of RE for mapping a PTRS and transmit related information to UEs. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may include an identifying function for identifying the location of the transmitted PTRS. Here, the identifying function may be a command/code temporarily resided in the controller 330, a storage space that stores the command/code, or a part of circuitry of the controller 330.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The BWP functionality allows available radio spectrum to be subdivided in a manner whereby each part of the BWP assignment can operate according to different parameters. For instance, a User Equipment (UE) can be allocated up to 4 BWPs with one being assigned to a particular service or class of data with specific numerology, for instance.

FIG. 5 shows how BWPs may be configured in the frequency/time space. A particular UE or terminal is configured with 4 BWPs. BWP1 has configuration A; BWP2 has configuration B; BWP3 and BWP4 have identical configurations C. This figure illustrates that different operational parameters may apply in different BWPs and the UE can switch between them as required.

According to exemplary embodiments of the present disclosure, the controller 330 may receive parameters related to the location of the PTRS by higher layer signalling or DCI. For example, the controller 330 may control the terminal to perform operations according to the exemplary embodiments of the present disclosure.

One particular parameter which can vary across different BWPs is the phase tracking reference signal (PTRS). This is provided to allow the UE to compensate for phase variations in a received resource element (RE). The density/pattern of PTRS may vary due to many factors, for instance 15 KHz to 60 KHz sub-carrier spacings in different BWPs.

It has been agreed as part of the standardization procedure that, for each serving cell,
  the maximum number of DL/UL BWP configurations is:
    For paired spectrum: 4 DL BWPs and 4 UL BWPs,
    For unpaired spectrum: 4 DL/UL BWP pairs, and
    For SUL: 4 UL BWPs;
  RRC configuration of thresholds in density tables:
  UE is configured with two sets of thresholds M={ptrsthMCS$_j$, j=1, 2, 3, 4} and R={ptrsthRB$_n$, n=0, 2, 4}, independently per BWP, using dedicated RRC signaling for UL and DL respectively;
  UE capability signaling of thresholds;
  A UE capability signals a recommended {M,R} for UL and DL respectively;
  The recommended {M, R} are expected to be larger than the predefined values;
  Support a Resource Block (RB)-level offset for selecting RBs among the scheduled RBs for mapping PTRS, and the offset is implicitly determined by UE-ID (i.e., C-RNTI), wherein the scheduled RBs are allocated for data transmission to a particular user equipment (UE);
  Support implicit derivation the RE-level offset for selecting subcarrier for mapping PTRS within an RB from one or more parameters (e.g., associated DMRS port index, SCID, Cell ID, to be decided in RAN1 #91);
    This can be used at least for avoiding collision with DC tone,
  In addition, an RRC parameter "PTRS-RE-offset" is also supported that explicitly indicates the RE-level offset and replaces the implicit offset, at least for avoiding collision with DC tone.

One problem may be inter-UE interference on PTRS symbols. In order to address this problem, RB level PTRS offset is introduced. This RB level PTRS offsets may also depend on the configurations of BWPs in neighbouring UEs. Considering the fact that other PTRS configuration parameters also depend on the BWP configuration, with multiple BWPs configured to a specific UE, the signalling overhead could be significant and the embodiments of the present disclosure aim to address such problems.

It has been agreed as part of the standardization process that an RB-level offset can be applied for selecting RBs among the scheduled RBs for mapping PTRS, and the offset is implicitly determined by a UE identifier (UE-ID) i.e., C-RNTI, wherein the scheduled RBs are allocated for data transmission to a particular user equipment (UE). However, the rules to map C-RNTI to a specific RB offset value are not specified as part of the standardization process.

This UE-specific offset might also be introduced at the RE, rather than RB, level. When configuring different RB/RE offsets for different UEs, the following multiple-to-one mapping problem might occur.

Essentially, RB/RE offset has limited options, e.g., for RB offset with Frequency Density (FD)=1/2, the RB offset can only be 0 or 1. However, UE specific configuration parameters, such as, C-RNTI, have many more options available. One possible mapping rule from C-RNTI to RB offset can thus be defined as:

$$RB_{offset} = \left\lfloor \frac{C-RNTI}{1/FD} \right\rfloor.$$

In an ideal case with FD=1/2, half of the UEs associated with one TRP need to have offset=0 and the other half will have offset=1. However, this cannot be guaranteed without imposing constraints on scheduling, which is not desirable in NR. Without such constraints, the consequences include multiple UE C-RNTI mapping to one RB offset and, therefore, there is no guarantee that two UEs within one MU-MIMO group have different RB offset and thus no guarantee of interference randomization.

The following alternative solutions can be used to decide offset values:

$$RB_{offset} = \left\lfloor \frac{C-RNTI}{1/FD} \right\rfloor \text{or} \quad (1a)$$

$$RB_{offset} = 1/FD - \left\lfloor \frac{C-RNTI}{1/FD} \right\rfloor, \quad (1b)$$

$$RB_{offset} = \left\lfloor \frac{\text{partial } C-RNTI}{1/FD} \right\rfloor, \quad (2)$$

and
(3): Use only the last log$_2$(1/FD) bits of C-RNTI.

The first options (1a) and (ab) use the entire C-RNTI string and are least likely to assign the same offset to different UEs but these have the highest calculation complexity.

The second option (2) uses only partial C-RNTI (the exact part can be specified as required), e.g., M bits (M<N)) and thus more likely than option (1) to assign the same offset to different UEs and has a lower calculation complexity than option (1).

The third option (3) is most likely to assign the same offset to different UEs but has the lowest calculation complexity of the three options.

The embodiments described above make use of C-RNTI, but note that other types of identifier (RNTI), such as RA-RNTI may be used.

Note that the same options can be used for RE level offset if it depends on UE ID or UE specific parameters.

In order to address the one-to-many mapping problem referred to above, RB/RE offset may only be decided by UE specific configuration parameters where the mapping is one-to-one to avoid any possible confusion. If this is not possible in some scenarios, RB/RE offset determined by multiple UE specific configuration parameters may be supported so that based on multiple rules, only one RB offset value is applied for each individual UE.

It should be noted that when different RB offsets are decided by multiple rules or parameters, it is desirable to setup a priority level so that the RB offset value from the rule/parameter with highest priority is adopted. This priority level can either be implicitly defined or explicitly signalled to the UE, as required.

The above-mentioned configuration of RB/RE offset may be per BWP, i.e., different BWPs may have different configurations.

It has been agreed in the standardization process that the following PTRS parameters need to be configured via RRC signaling:

Frequency Density for CP-OFDM in both DL and UL;
Time Density for CP_OFDM in both DL and UL; and
Time Density and PTRS chunk size for DTF-s-OFDM.

Each one of these parameters may be a structure formed from multiple parameters that control the presence and density of PTRS as a function of scheduled BW and/or Modulation and Coding Scheme (MCS). Moreover, these parameters need to be configured for each BWP.

Different BWP may have different subcarrier spacing and the above parameters may be relevant to subcarrier spacing, although it is not necessarily advisable to completely re-configure them differently in such a case. The simplest way is to configure each BWP separately, using a brute-force technique of explicit configuration. However, considering that up to 4 BWPs can be configured, the RRC payload for configuring these parameters may be quadrupled if 4 BWPs are configured. The payload could thus be significant even for RRC configuration.

Based on the fact that the PTRS configuration is not always different for different BWP, it is possible to make use of some form of offset RRC configuration for multiple BWPs, where PTRS is configured for the default BWP via RRC but for the rest of the BWPs, only the difference between one BWP and the default BWP is configured via RRC. This has the effect of reducing RRC payload for PTRS configuration.

Three different embodiments are presented:

(1) Offset Configuration

For the default BWP, an N bits binary sequence a is used to configure PTRS parameters. For a non-default BWP, a further N bits binary sequence b is used. The difference, i.e., a-b or b-a, is likely to be shorter than either a or b due to its smaller range. Therefore, for any non-default BWP, instead of using b, the value of the difference (i.e., a-b or b-a) can be used to configure PTRS via RRC. This offset configuration may reduce the RRC signaling overhead.

(2) One Additional Indication Bit

In this embodiment, one additional indication bit is configured for each non-default BWP. The current agreement is that up to 4 BWPs can be configured and if it is assumed that N bits are required to configure all PTRS parameters for each BWP, then 4*N bits are required in total.

However, with one additional indication bit, N bits may still be used to configure the default BWP but for other non-default BWPs, if the BWP configuration is the same as the default BWP, the indication bit may be set (or reset) as specified. Therefore, there is no need to use additional N bits to configure the non-default BWP if its configuration is the same as the default BWP.

In the best case, where all BWP configurations are the same, then for 4 BWPs, N+3 bits are required instead of 4*N bits to configure all BWPs via RRC. In this way, 3*N−3 bits can be saved and RRC signaling overhead is reduced.

In the worst case, where each BWP has a different configuration, 3 additional indication bits are required in addition to 4*N bits for PTRS configuration. However, the worst case is not likely to occur very often so that, in most cases, RRC payload can be significantly reduced.

Note that if it is desired or necessary to retain identical configurations for each payload, it may be necessary to also include the additional bit, even for the default configuration so that all possible configurations have the same number of bits for each BWP.

(3) Codeword Based Approach

Another possible option for RRC signaling for BWP based PTRS configuration is to use codewords for each of the available configuration options. Depending on the probability of the usage of each PTRS configuration, either variable length code words or a code book with fixed length codewords may be used.

If the default PTRS configuration and a few variations are highly probable, shorter code words can be used to indicate these configurations, while longer codewords can be used for others. A length indicator will be also needed in the message, to effectively decode the codewords. If there is a more even distribution of configuration options, equal length codewords making up a codebook can be used. In this case only the index of the codeword (known a-priori by the UE) needs to be transmitted in RRC signaling.

Another issue is that PTRS configuration might not be always necessary since the default configuration may be used if no significant performance loss is observed. When RRC configuration is needed, the offset configuration approach (1) mentioned above can potentially be applied as well to reduce RRC signaling.

Another use case is when RRC reconfiguration needs to be carried out for PTRS configuration, the offset configuration approach can be employed.

The benefit of configuring PTRS for all BWPs via RRC is when BWP switching happens, there is no need to configure PTRS again and thus latency due to BWP switching can be reduced. At any one time, only one BWP can be activated for the UE. The UE starts on the default BWP and will switch to another BWP if instructed or if deemed necessary. Once the switch occurs, a timer is started and the UE switched back to the default BWP upon expiry of the timer.

However, the disadvantage of RRC configuration is that it is semi-persistent, meaning that the configuration cannot be changed dynamically. In this regard, Downlink Control Indicator (DCI) configuration can also be used to configure PTRS parameters when BWP switching happens. The above mentioned three options can be employed for DCI configuration as well. DCI configuration can occur every slot, so that the configuration can be changed every slot in a dynamic manner. However, RRC configuration only occurs at the beginning of a transmission and so will persist for several slots/sub-frames/frames. It is therefore considered semi-persistent.

It has been agreed in the standardization procedure that the UE may recommend two sets of thresholds for frequency and time density tables, respectively, and the UE report should also be provided per BWP. Following the same rationale as above, the payload of UE reporting may be significant if multiple BWPs are configured. In this regard, the three options mentioned above for RRC configuration may also be applied for a UE report to reduce the UE report signaling overhead. The UE reporting can be done via UCI or UE Capability signaling.

One additional use case is that when the UE decides to report a new set of thresholds different from the previous set for some reason, offset reporting can be used to reduce signaling overhead.

For a better understanding of the invention, and to show how embodiments of the same may be carried into effect, reference will now be made, by way of example only, to the accompanying diagrammatic drawings in which:

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method performed by a base station (BS) in a wireless communication system, the method comprising:
   receiving, from a user equipment (UE), UE capability information including:
      a first set of parameters including a first phase tracking reference signal (PTRS) frequency density values and a first PTRS time density values associated with at least one subcarrier spacing, and
      a second set of parameters including a second PTRS frequency density values and a second PTRS time density values associated with at least one subcarrier spacing; and
   transmitting, to the UE, via a radio resource control (RRC) signaling, a PTRS configuration used for mapping PTRS for a bandwidth part (BWP) including information on a resource element (RE) offset, information related to a frequency density and information related to a time density,
   wherein the BWP corresponds to one of the at least one subcarrier spacings.

2. The method of claim 1, wherein each of the first set of parameters and the second set of parameters is associated with one of a downlink (DL) PTRS and an uplink (UL) PTRS.

3. The method of claim 1, wherein a resource block (RB) offset is identified based on a modulo operation of an identifier of the UE and the frequency density.

4. The method of claim 1, further comprising:
   identifying a resource block (RB) offset associated with the BWP based on the frequency density and an identifier of the UE; and
   mapping at least one phase tracking reference signal (PTRS) based on the RB offset and the RE offset.

5. The method of claim 4, wherein the RB offset and the RE offset are configured per BWP.

6. A method performed by a user equipment (UE) in a wireless communication system, the method comprising:
   transmitting, to a base station (BS), UE capability information including:
      a first set of parameters including a first phase tracking reference signal (PTRS) frequency density values and a first PTRS time density values associated with at least one subcarrier spacing, and
      a second set of parameters including a second PTRS frequency density values and a second PTRS time density values associated with at least one subcarrier spacing; and
   receiving, from the BS, via a radio resource control (RRC) signaling, a PTRS configuration used for mapping PTRS for a bandwidth part (BWP) including information on a resource element (RE) offset, information related to a frequency density and information related to a time density,
   wherein the BWP corresponds to one of the at least one subcarrier spacings.

7. The method of claim 6, wherein each of the first set of parameters and the second set of parameters is associated with one of a downlink (DL) PTRS and an uplink (UL) PTRS.

8. The method of claim 6, wherein a resource block (RB) offset is identified based on a modulo operation of an identifier of the UE and the frequency density.

9. The method of claim 6,
wherein a resource block (RB) offset associated with the BWP is identified based on a frequency density and an identifier of the UE, and
wherein the RB offset and the RE offset are used to map at least one PTRS.

10. The method of claim 9, wherein the RB offset and the RE offset are configured per BWP.

11. A base station (BS) in a wireless communication system, the BS comprising:
a transceiver; and
at least one processor coupled to the transceiver, configured to:
receive, from a user equipment (UE), UE capability information including:
a first set of parameters including a first phase tracking reference signal (PTRS) frequency density values and a first PTRS time density values associated with at least one subcarrier spacing, and
a second set of parameters including a second PTRS frequency density values and a second PTRS time density values associated with at least one subcarrier spacing; and
transmit, to the UE, via a radio resource control (RRC) signaling, a PTRS configuration used for mapping PTRS for a bandwidth part (BWP) including information on a resource element (RE) offset, information related to a frequency density and information related to a time density,
wherein the BWP corresponds to one of the at least one subcarrier spacings.

12. The BS of claim 11, wherein each of the first set of parameters and the second set of parameters is associated with one of a downlink (DL) PTRS and an uplink (UL) PTRS.

13. The BS of claim 11, wherein a resource block (RB) offset is identified based on a modulo operation of an identifier of the UE and the frequency density.

14. The BS of claim 11, wherein the at least one processor is further configured to:

identify a resource block (RB) offset associated with the BWP based on the frequency density and an identifier of the UE; and
map at least one phase tracking reference signal (PTRS) based on the RB offset and the RE offset.

15. The BS of claim 14, wherein the RB offset and the RE offset are configured per BWP.

16. A user equipment (UE) in a wireless communication system, the UE comprising:
a transceiver; and
at least one processor coupled to the transceiver, configured to:
transmit to a base station (BS), UE capability information including:
a first set of parameters including a first phase tracking reference signal (PTRS) frequency density values and a first PTRS time density values associated with at least one subcarrier spacing, and
a second set of parameters including a second PTRS frequency density values and a second PTRS time density values associated with at least one subcarrier spacing; and
receive, from the BS, via a radio resource control (RRC) signaling, a PTRS configuration used for mapping PTRS for a bandwidth part (BWP) including information on a resource element (RE) offset, information related to a frequency density and information related to a time density,
wherein the BWP corresponds to one of the at least one subcarrier spacings.

17. The UE of claim 16, wherein each of the first set of parameters and the second set of parameters is associated with one of a downlink (DL) PTRS and an uplink (UL) PTRS.

18. The UE of claim 16, wherein a resource block (RB) offset is identified based on a modulo operation of an identifier of the UE and the frequency density.

19. The UE of claim 16, wherein a resource block (RB) offset associated with the BWP is identified based on a frequency density and an identifier of the UE, and
wherein the RB offset and the RE offset are used to map at least one PTRS.

20. The UE of claim 19, wherein the RB offset and the RE offset are configured per BWP.

* * * * *